March 9, 1926.  P. TOORKS  1,575,953

ATTACHMENT FOR DRILLING MACHINES

Filed March 31, 1925

INVENTOR
Peter Toorks
by Fred W. McArdle
atty

Patented Mar. 9, 1926.

1,575,953

UNITED STATES PATENT OFFICE.

PETER TOORKS, OF BOSTON, MASSACHUSETTS.

ATTACHMENT FOR DRILLING MACHINES.

Application filed March 31, 1925. Serial No. 19,602.

*To all whom it may concern:*

Be it known that I, PETER TOORKS, a citizen of Latvia, residing at Boston, in the county of Suffolk and State of Massachusetts, have invented certain new and useful Improvements in Attachments for Drilling Machines, of which the following is a specification.

My invention relates to attachments for drilling machines, and is particularly applicable to that class of machines comprised of portable or manually operated drilling apparatus.

My object is to provide an attachment that may be substituted for the drill chuck, commonly used with this type of apparatus, and to transfer the chuck to an angularly disposed shaft, driven rotatively from the spindle of the apparatus, thus making it possible to operate in cavities or other confined spaces.

Ordinarily it is impossible to operate with a portable drilling apparatus, whether operated by hand or otherwise on account of the space required for the operative mechanism, and it is necessary to use a ratchet drill or a gimlet as the case demands.

With my invention, attached to the ordinary drilling apparatus, the action of the operative mechanism is transmitted to a relatively compact extension which may be used in places where it would be impossible to operate directly on the surface to be drilled.

My invention is fully described and illustrated in the accompanying specifications and claim, and the drawings forming a part thereof, in which:—

Figure 3:
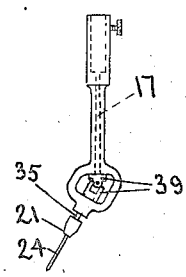
Figure 1:
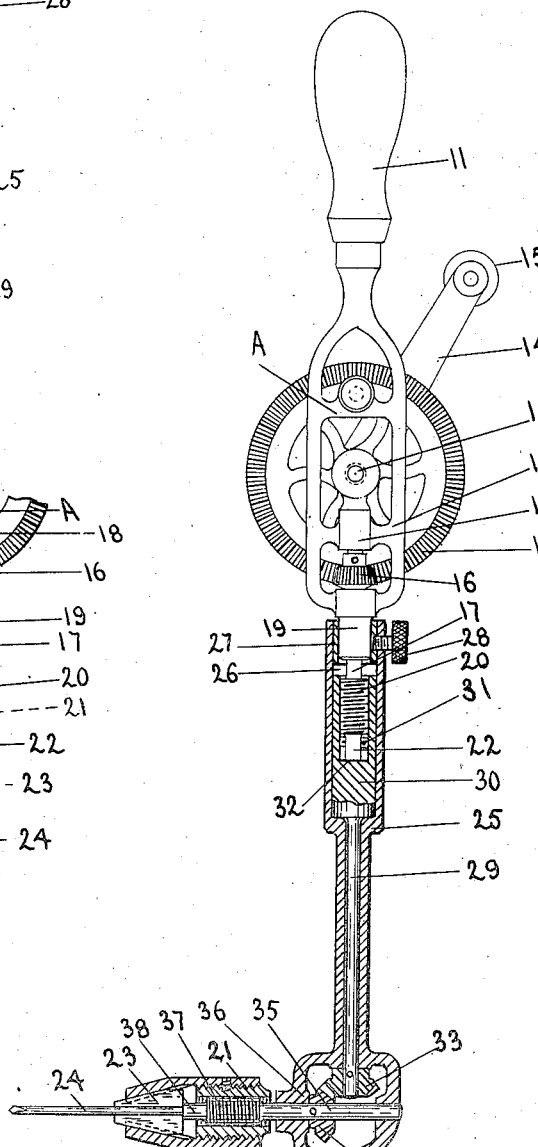
Fig. 1 is a sectional elevation of a preferred form of my invention as used in connection with a hand operated drilling apparatus, commonly known as a breast drill.

Fig. 3 is a diagrammatic representation of a modification of my attachment.

Figure 4:
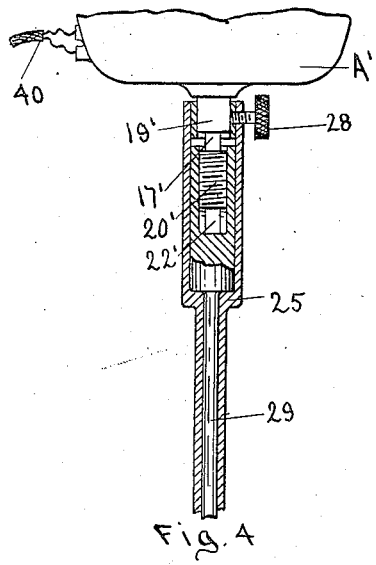
Figure 2:
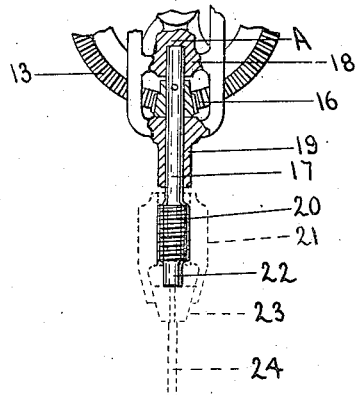
Fig. 2 is a fragment of the same apparatus, indicating the drill chuck as used in ordinary practice.

Fig. 4 shows the attachment as adapted to use with an electric drill.

In the drawings, A is a hand drilling apparatus in which 10 is the frame work or body, 11 a handle for steadying the apparatus when in use. On a stud 12, projecting from a boss, integral with the frame 10, is journaled the spur bevel gear 13, which is adapted to be rotated on its stud by means of the crank 14, provided with the handle 15. The spur gear 13 meshes with the pinion 16, secured to the spindle 17.

This spindle is journaled at 18 in a bearing which serves both for rotary action of the spindle and as a thrust bearing to resist the pressure endwise on the spindle when in operation. In addition the spindle is journaled in the hub 19, which serves as the main bearing and offers a convenient projection to which my attachment may be secured.

The spindle 17 is provided with a threaded portion 20, and a drill chuck 21 is tapped to engage the threaded portion 20, a reduced portion of the spindle at 22 on the spindle being adapted to abut against the ends of a plurality of taper jaws 23, and to tighten them on a drill 24.

As described, this is a common type of hand drill, used extensively in wood work drilling, and where it is possible to bring direct pressure to bear on the handle 11 while the crank 14 is being operated, the apparatus is effective.

To extend such effective action I have provided the attachment which is the subject of this application.

In the preferred form herein shown, 25 is a supporting member, which may be preferably in the form of a tubular post. This member is socketed at one end, 26, to receive the spindle bearing hub of a drilling apparatus of the kind described, the socket being of sufficient diameter to permit the use of different bushings, 27, which may be required for use with different makes of drilling apparatus.

To secure the supporting member to the aforementioned hub one means is to use a set screw, 28 which is tapped in the wall of the socket, and, passing through the side of the bushing, abutting the hub 19. The supporting member 25 provides a bearing for the shaft 29, the axis of which coincides with the extended axis 17 of the apparatus.

The upper end of this shaft is enlarged at 30, and tapped at 31 to engage the correspondingly threaded portion 20, of the spindle 17. The tapped hole is of such depth, that the end 22 of the spindle 17 will engage at the bottom thereof as at 32, and continued rotation of the spindle 17 will operate to rotate the shaft 29. The set screw 28 may now be tightened on the hub 19, and the attachment rigidly secured to the drilling apparatus, without affecting the rotative action of the spindle 17 and the shaft 29.

Rigidly secured to the other end of the shaft 29 is a bevel gear 33 which meshes with a corresponding gear 34 rigidly secured to the shaft 35. This shaft is journaled in an extension of the supporting member 25, as at 36, and the shaft is provided with a threaded portion 37, and a reduced end 38, duplicating the corresponding portions of the spindle 17.

To this end of the shaft 35, the chuck 21 is attached in similar manner to that used when operated as a part of the drilling apparatus as originally composed. The axes of rotation of the shafts 29 and 35 may be predetermined at any convenient angle, and in Fig. 3 the shafts are shown operatively connected by means of a universal joint 39, and such construction may be used where the angle between the axes of the shafts will permit. It will be obvious that the elements of this attachment, and the means for securing it to a drilling apparatus, may be varied in construction without departing from the spirit and scope of my invention, and that different forms of portable drilling apparatus may be used in connection with this attachment.

In Fig. 4 this attachment is shown as applied to an ordinary portable electric drilling apparatus, A' being a motor, with electric lead wires 40. The hub 19' of the motor is utilized in a similar manner to that already described, and the motor shaft 17' is adapted to operate in similar manner to spindle 17 of the hand apparatus.

Having thus described my invention, I claim:—

An attachment for a hand drill comprising a supplemental frame, having means for attachment to the frame of said drill, after the removal of the chuck from the latter; a shaft rotatably mounted in said supplemental frame, and constructed at one end with a threaded socket to receive the threaded extremity of the drill spindle, vacated by the chuck; a supplemental spindle rotatably mounted in the supplemental frame at an angle with relation to the axis of said shaft, said spindle having a threaded extremity which is a counterpart of the threaded extremity of the drill spindle, and to which the chuck is transferred from the drill spindle; and means by which said socketed shaft operates to drive the supplemental spindle, for the purpose of rotating the chuck on the supplemental spindle.

PETER TOORKS.